No. 709,665. Patented Sept. 23, 1902.
T. CORT.
FOOT MEASURING DEVICE FOR SHOEMAKERS.
(Application filed Feb. 8, 1901.)
(No Model.)
2 Sheets—Sheet 1.

WITNESSES:
Henry Krug
Russell M. Everett

INVENTOR
Thomas Cort,
BY
Drake & Co.
ATTORNEYS.

No. 709,665. Patented Sept. 23, 1902.
T. CORT.
FOOT MEASURING DEVICE FOR SHOEMAKERS.
(Application filed Feb. 8, 1901.)
(No Model.) 2 Sheets—Sheet 2.

WITNESSES: INVENTOR:
Henry Krug Thomas Cort,
Russell M. Everett BY
Drake Co
ATTORNEYS.

UNITED STATES PATENT OFFICE.

THOMAS CORT, OF SOUTH ORANGE, NEW JERSEY.

FOOT-MEASURING DEVICE FOR SHOEMAKERS.

SPECIFICATION forming part of Letters Patent No. 709,665, dated September 23, 1902.

Application filed February 8, 1901. Serial No. 46,501. (No model.)

*To all whom it may concern:*

Be it known that I, THOMAS CORT, a citizen of the United States, residing at South Orange, in the county of Essex and State of New Jersey, have invented certain new and useful Improvements in Foot-Measuring Devices for Shoemakers' Use; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a combined "measuring-stick" and tape for shoemakers' use which will permit a convenient carrying in the pocket, so that when the shoemaker finds it necessary to go a distance to measure a foot preliminary to making a pair of shoes he will not experience the inconvenience heretofore common in connection with the rigid measuring-stick, to combine in one article the measuring-stick and tape heretofore common in two articles, to reduce the cost of construction, and to secure other advantages and results, some of which may be referred to hereinafter in connection with the description of the working parts.

The invention consists in the improved foot-measuring device for shoemakers and in the arrangements and combinations of parts of the same, all substantially as will be hereinafter set forth, and finally embraced in the clauses of the claim.

Figure 1:
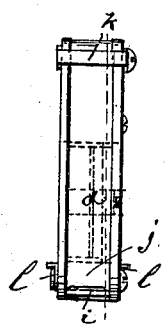
Figure 2:
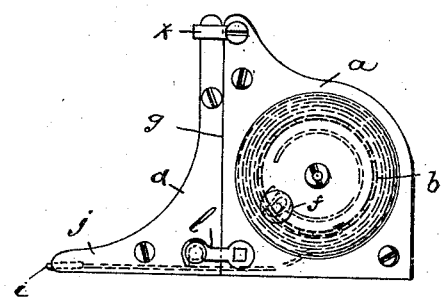
Figure 3:
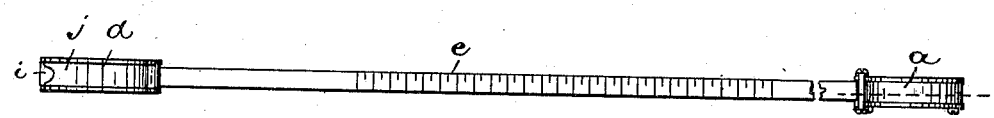
Figure 7:
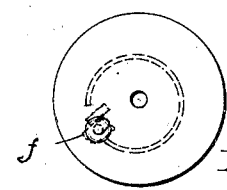
Figure 8:
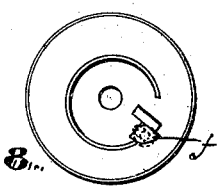
Figure 4:
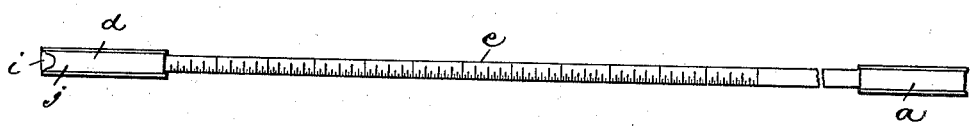
Figure 5:
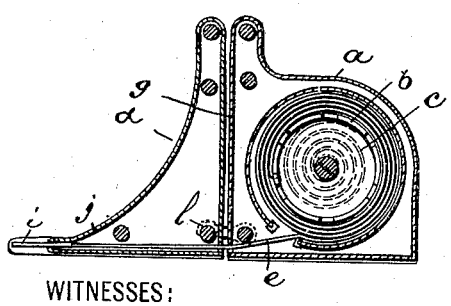
Figure 6:
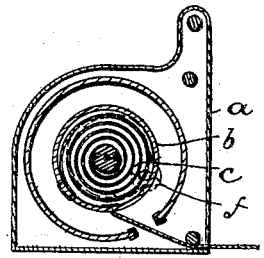
Figure 9:
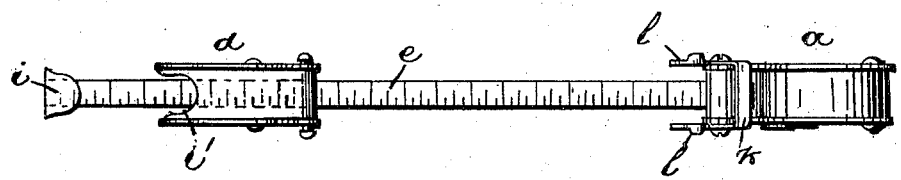
Figure 10:
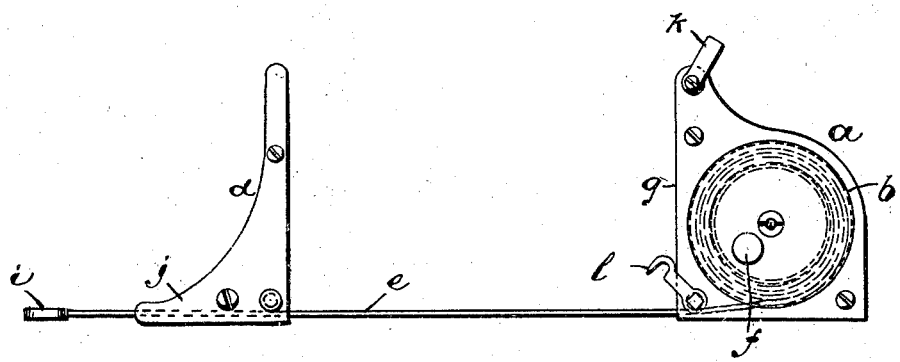

Referring to the accompanying drawings, in which like letters of reference indicate corresponding parts in each of the several figures, Figure 1 is a front view, and Fig. 2 is a side view, of my improved measuring device when the same is closed. Fig. 3 is a plan of the same when said device is open for use and showing the "size-stick" in plan. Fig. 4 is a reversed plan showing the measuring-tape on the under side. Fig. 5 is a vertical and longitudinal section of the closed device. Fig. 6 is another such section taken through the spring-chamber, and Figs. 7 and 8 are outside and inside views of a certain side plate of the winding-drum. Fig. 9 is a plan of the device opened or extended for use, the toe-tongue being slid in from the end of the tape; and Fig. 10 is a side elevation of the same.

In said drawings, $a$ indicates a case inclosing a drum $b$ of any suitable construction which may be and preferably is operated by a spring $c$ after the fashion of an ordinary spring-roller, tape-measure, or other spring-actuated drum adapted to automatically wind the tape after the same has been drawn out and used, and $d$ is the "tongue" of the stick, adapted to engage the toe in measuring the length of the foot.

$e$ is a flexible stick having the usual standard indicating-marks commonly found in rigid foot-measuring sticks, by which the length size of the feet may be observed. Said flexible size-stick is attached at one end to the spring-actuated drum $b$ and is adapted to be drawn out from the case $a$ for measuring purposes, and when drawn out to a proper limit the said stick is automatically fastened by a spring-actuated catch $f$, to hold the same withdrawn and at its proper measuring position. The case $a$, at its inner side, is perpendicular to the withdrawn stick, as at $g$, and is thus adapted to engage the "ball" of the heel of the shoe and coöperate with the part $d$ in giving the desired measure. On the under side of the flexible stick I employ the size-marks of a standard tape-measure, by means of which the size of the foot at different points therearound may be taken as by an ordinary tape-measure, the tongue $e$ being pushed along the stick to the case $a$, so that the flexible stick or tape is free to be flexed about the foot. The said tongue $d$ is slidably mounted upon the measuring stick or tape $e$, so that it can be slid along the same to engage the toe of the foot and indicate the necessary size of shoe, as illustrated in Figs. 9 and 10. When the toe-tongue is not in use, it is fastened to the heel-rest, as hereinafter described, and the tape can then be drawn out freely through the toe-tongue for independent measuring use, as above referred to.

In operating the device after the stick and tongue have been drawn out to the standard length of a size-stick and the foot placed on said tape with the ball of the heel against the perpendicular bearing-surface $g$, the tongue $d$ is moved inward toward the case $a$ to engage the toe of the foot, and the inward face of the said tongue will then coincide with the indicating-mark on the stick which expresses or shows the size of the foot.

The free outer extremity of the tape $e$ is provided with an enlarged or widened tip $i$, which prevents the tongue $d$ sliding off said tape.

When the catch $f$ is released, and the toe-tongue $d$ and heel-bearing $g$ of the case are drawn together by the spring, the same may be readily and securely joined or connected by means of suitable fasteners $k\ l$ at the top and bottom of said parts, as shown in the drawings or in any other suitable manner.

The bottom faces of the heel-case and toe-tongue are preferably formed on a horizontal line to provide for a suitable bearing upon which the device will stand upright upon the floor or surface to permit of the foot being inserted between.

This device may be made of sheet metal, celluloid, or any other suitable material or combination of materials.

Having thus described the invention, what I claim as new is—

1. A shoemaker's foot-measuring device, comprising a case $a$, adapted to engage the heel of a foot, a drum in said case and a flexible measure wound on said drum and projecting from the case, and a tongue $d$, adapted to engage the toe of the foot, slidably mounted upon said flexible measure and connected thereby to the case $a$.

2. A shoemaker's foot-measuring device, comprising a case $a$, and a tongue $d$, said parts having adjacent faces adapted to receive between themselves a foot to be measured, a drum in said case, and a flexible measure wound on said drum and adapted to be drawn out of the case, said measure having at one side size-marks for determining the number of shoe needed and at the other side standard graduations for measuring distance, and said tongue being slidably mounted on the measure.

3. A shoemaker's foot-measuring device, comprising a case $a$, and a tongue $d$, each having a base and a face at right angles to said base, means for fastening said case and tongue together with their faces in contact, and a flexible measure mounted in the case and having its end projecting therefrom and passing loosely through the tongue, and means for preventing said tongue from being slid off the measure.

4. In a shoemaker's foot-measure, the combination of a heel-rest and a toe-tongue, means for separably connecting said parts, a reel in said heel-rest, a tape wound on said reel and extending out from said heel-rest and passing slidably through the toe-tongue, and a stop on the end of said tape beyond the toe-tongue.

5. In a shoemaker's foot-measure, the combination of a heel-rest, a toe-tongue, and a flexible tape connecting said parts, one of the said parts having means for winding up the tape and the other being slidable on said tape.

In testimony that I claim the foregoing I have hereunto set my hand this 1st day of February, 1901.

THOMAS CORT.

Witnesses:
CHARLES H. PELL,
C. B. PITNEY.